United States Patent Office 3,162,695
Patented Dec. 22, 1964

3,162,695
BLENDS OF POLYCARBONATES WITH BUTADIENE - STYRENE, METHYL METHACRYLATE, STYRENE GRAFT COPOLYMER
Thomas S. Grabowski, Vienna, W. Va., assignor to Borg-Warner Corporation, Chicago, Ill., a corporation of Illinois
No Drawing. Filed June 26, 1961, Ser. No. 119,293
4 Claims. (Cl. 260—873)

The present invention relates to synthetic resins having new and unique properties. More particularly, this invention relates to synthetic resins exhibiting unexpected thermoplastic properties.

The polycarbonate resins have excellent properties for molded and shaped articles, including excellent heat distortion properties. However, due to the low thermoplasticity of the polycarbonates, it is very difficult to utilize the polycarbonates to the fullest extent due to their low flow characteristics.

Graft copolymers prepared by polymerizing methyl methacrylate and styrene monomers in the presence of a butadiene-styrene latex are tough, rigid materals having limited utility due to their relatively low heat distortion temperature.

The present invention relates to the improvement of the properties of both polycarbonates and graft copolymers. In particular, the present invention contemplates the blending of polycarbonates, more particularly the polycarbonate of 2,2-(4,4'-dihydroxy-diphenyl)-propane, with certain graft copolymer containing butadiene, methyl methacrylate and styrene, the preferred graft copolymer being prepared by polymerizing styrene and methyl methacrylate monomers in the presence of a butadiene-styrene rubber.

THE POLYCARBONATE

The polycarbonates of the present invention are made by converting di-(mono-hydroxy phenyl)-substituted aliphatic hydrocarbons with phosgene in a manner well known in the art. For example, British Patent 772,627, April 17, 1957, discloses suitable examples of the di-(mono-hydroxy phenyl)-substituted aliphatic hydrocarbons and the methods of converting these materials to polycarbonates. A typical polycarbonate for utilization in the present invention is the polycarbonate of 2,2-(4,4'-dihydroxy-diphenyl)-propane, which polycarbonate has the following properties:

Izod impact strength, ft. lb./inch notch ⅛" bar
73° F. _____ 14.1
Tensile strength, p.s.i. 73° F. _____ 9100
Tensile elongation _____percent__ 130
Hardness Rockwell R _____ 125
Hardness Rockwell L _____ 99
Melt index 410° F.[1] _____ .2A1

[1] A modification of the procedure set forth in A.S.T.M. Method D–1238–52T. This procedure was originally developed for determining the melt index of polyethylene. Broadly and briefly, in this method, the weight in grams of polyethylene that is discharged during a period of three minutes through a standard orifice positioned below a reservoir of the polymer that is at a standard temperature and under a standard pressure is determined. This determination is proportioned to give the grams of polymer discharged during ten minutes which figure is, by definition, the melt index of polyethylene.
Since the thermoplasticity of the blends with which this invention is concerned is not even of the same order of magnitude as that of polyethylene, a considerable modification of the standard conditions and dimensions set forth in A.S.T.M. Method D–1238 had to be made in order to make this general method applicable to the blends with which this invention is concerned. These modifications involved changes in the size of the orifice, the pressure applied to the plastic in the reservoir, the reservoir temperature, and the like.
As used herein, melt indexes express the weight in grams of polymer blend discharged in three minutes through an orifice 0.125 inch in diameter and 0.315 inch long from a reservoir 0.373 inch in diameter containing polymer maintained at a temperature of 410° F. and under a pressure produced by a 5564 g. load. Thus, a melt index of 0.2A1 means that 0.2 g. of polymer were discharged through the orifice in one minute under the conditions named.

Deflection temperature ° F. ½" x ½" x 5" bar
12 p.s.i. _____ 278
Deflection temperature ° F. ½" x ½" x 5" bar
264 p.s.i. _____ 264

THE GRAFT COPOLYMEER

Within recent years it has been increasingly common practice to prepare polymeric products by the so-called "graft" polymerization technique. As may be determined by reference to the Report on Nomenclature of the International Union of Pure and Applied Chemistry (published in the Journal of Polymer Science, volume 8, page 260, 1952), the term "graft polymerization" is employed to designate the process wherein a polymerizable monomer (or mixture of polymerizable monomers) is reacted, under polymerizing conditions, in the presence of a previously formed polymer or copolymer. "A graft copolymer is a high polymer, the molecules of which consist of two or more polymeric parts, of different composition, chemically united together. A graft copolymer may be produced, for example, by polymerization of a given kind of monomer with subsequent polymerization of another kind of monomer onto the product of the first polymerization."

Graft copolymers produced by the interaction, under polymerizing conditions, of a conjugated diolefinevinyl aromatic copolymer latex with a mixture of methyl methacrylate and a vinyl aromatic are excellent for blending with polycarbonates.

Example 1

A typical recipe for the preparation of the graft copolymer is as follows:

70:30 butadiene-styrene copolymer (about 60%
  solids content) _____ 60
Methyl methacrylate _____ 25
Styrene _____ 15
Water _____ 182
Sodium salt of hydrogenated, disproportionated
  rosin _____ 1.96
Sodium hydroxide _____ 0.15
Sodium pyrophosphate, anhydrous _____ 0.5
Glucose _____ 1.0
Ferrous sulfate heptahydrate _____ 0.011
Sodium dodecyl benzene sulfonate _____ 2.0
Cumene hydroperoxide (73% strength) _____ 1.0

The mixture set forth in the above recipe was heated to 60° C. and allowed to react under agitation for 0.5 hour, at which time an additional 1.0 part by weight of the 73% cumene hydroperoxide was added to the reaction mixture. Agitation at the temperature previously given was continued for an additional hour. At the end of this time reaction was essentially complete.

At the conclusion of the polymerization reaction an emulsion containing one part 2,6-di-tertiary butyl p-cresol and 0.5 part polyalkyl polyphenols was added to the resulting graft copolymer latex. These materials improved the environmental stability of the final graft copolymer product. Other suitable stabilizers or mixtures thereof may be employed in lieu of the specific materials named; or, if desired, use of a stabilizer or stabilizer mixture may be dispensed with entirely with some sacrifice, of course, in the environmental stability of the graft polymer product.

The graft copolymer latex was then worked up by conventional procedures. These procedures involved coagulating the latex by mixing it with a comparatively large volume of a solution of an electrolyte (dilute sulfuric acid solution), heating this resulting coagulated mixture to near the boiling point thereof (to produce partial agglomeration and granulation of the coagulum, thus facilitating subsequent filtering and washing operations), separating the coagulum by filtration, washing and drying.

The properties of the above prepared graft copolymer are as follows:

TABLE I

| | |
|---|---|
| Izod impact strength, ft. lb./inch notch ⅛" | 2.3 |
| Melt index 410° F. | 0.3A3 |
| Tensile strength, p.s.i. 73° F. | 5600 |
| Tensile elongation 73° F. percent | 25 |
| Deflection temperature ° F. ½" x ½" x 5" bar 12 p.s.i. | 208 |
| Deflection temperature ° F. ½" x ½" x 5" bar 264 p.s.i. | 171 |
| Hardness Rockwell R | 115 |
| Hardness Rockwell L | 81 |

THE BLEND

The graft copolymer, prepared as set out hereinabove, was blended with 2,2-(4,4'-dihydroxy-diphenyl)-propane at various graft copolymer-polycarbonate ratios. In making the blends, the graft copolymer and the poly-carbonate were mixed with one and one-half (1.5) parts by weight of lubricant. In this case the lubricant was Advawax 280, a N,N' ethylene bis-stearamide synthetic wax. The mixture of graft copolymer, polycarbonate, and lubricant was worked in a Banbury mixer at a temperature of about 420° F. Milling was then continued on a two-roll mill until a uniform blend was obtained, and the blend was then sheeted. In all instances, the milling operation provided rapid and complete blending of the mill recipe forming the sheet.

copolymer backbone:methyl methacrylate-styrene monomer mixtures over a wide range of ratios are effective. Thus, graft copolymer blending components made at butadiene-styrene copolymer backbone to methyl methacrylate-styrene monomer mixture that is ratios ranging from 80:20 to 20:80 are highly effective for the purposes of the present invention.

The styrene component may be replaced, in part or entirely, by such vinyl aromatics as alpha methyl styrene, vinyl toluenes, alpha methyl vinyl toluenes and the like, including mixtures of two or more such vinyl aromatics (including styrene).

Likewise, the methyl methacrylate component and/or the styrene component of the monomer mixture graft polymerized onto the previously described copolymer backbone to produce the graft copolymer blending components of this invention may be replaced, in part or entirely, with equivalent materials. Thus, the methyl methacrylate component of the monomer mixture employed in the graft polymerization reaction may be replaced, in part or entirely, by a different lower alkyl ester of an alpha-lower alkyl acrylic acid or a mixture thereof. However, in view of the ready availability and comparatively low cost of methyl methacrylate, the higher homologues thereof hardly merit present consideration as partial or complete replacements therefor.

Similarly, the styrene component of the monomer mixture employed in the graft polymerization reaction may be replaced, in part or entirely, by such other vinyl aro-

TABLE II

| Run | A | B | C | D | E | F | G | H | I | J | K |
|---|---|---|---|---|---|---|---|---|---|---|---|
| Graft Copolymer of Example 1 | 95 | 90 | 85 | 80 | 75 | 70 | 60 | 50 | 40 | 30 | 20 |
| Polycarbonate of 2,2-(4,4'-dihydroxy-diphenyl)-propane | 5 | 10 | 15 | 10 | 25 | 30 | 40 | 50 | 60 | 70 | 80 |
| Tensile, 73° F. (p.s.i.) | 5,700 | 5,900 | 6,100 | 6,300 | 6,300 | 6,500 | 7,000 | 7,300 | 7,700 | 8,000 | 8,900 |
| Elongation, 73° F, percent | 25 | 25 | 20 | 20 | 25 | 25 | 30 | 55 | 35 | 60 | 70 |
| Izod Impact, 73° F., ft. lbs./in | 2.3 | 2.3 | 2.3 | 2.6 | 2.6 | 2.3 | 4.4 | 5.4 | 7.0 | 9.5 | 10.0 |
| Izod Impact, −40° F., ft. lbs./in | 0.8 | 0.8 | 0.7 | 0.7 | 0.8 | 0.9 | 0.8 | 0.9 | 1.5 | 1.3 | 1.7 |
| Hardness, Rockwell R | 110 | 110 | 112 | 113 | 113 | 111 | 113 | 115 | 117 | 120 | 121 |
| Hardness, Rockwell L | 74 | 76 | 79 | 76 | 87 | 87 | 87 | 84 | 87 | 92 | 95 | 98 |
| Heat Deflection Temp., ½ x ½ @ 12 p.s.i. (° F.) | 214 | 214 | 214 | 218 | 221 | 224 | 259 | 260 | 261 | 270 | 268 |
| Heat Deflection Temp., ½ x ½ @ 264 p.s.i. (° F.) | 176 | 176 | 177 | 182 | 189 | 190 | 191 | 209 | 219 | 228 | 238 |
| Melt Index, 410° F [1] | 0.4A1 | 0.5A1 | 0.3A1 | 0.3A1 | 0.6A1 | 0.6A1 | 0.7A1 | 0.7A1 | 0.8A1 | 0.8A1 | 1.0A1 |

[1] Modified A.S.T.M. D1238-52T as defined heretofore.

Blends prepared in accordance with this invention may contain additional components, such as for example, pigments, fillers, and the like, which are frequently incorporated into resins and resinblends in accordance with conventional practices well known to those skilled in the art.

The butadiene-styrene ratio of the copolymer backbone used in forming the graft polymer blending components of this invention does not appear to be critical. Butadiene-styrene ratios of from 1:1 to 9:1 can be used successfully in preparing the copolymer backbone and; as a matter of fact, butadiene-styrene ratios much lower than 1:1, for example, 1:3, may be employed if desired.

The ratio of methyl methacrylate to styrene in the monomer mixture that is graft polymerized onto the butadiene-styrene copolymer backbone similarly does not appear critical. Actually, products useful for accomplishing the objects of this invention may be prepared using a methyl methacrylate to styrene ratio ranging from about 1:3 upwards to 11:1. However, all points of view considered, it is believed that the graft polymer blending component prepared with a methyl methacrylate to styrene ratio of 2:1 is the most interesting.

The graft polymer blending components described in Example 1 were prepared using a 60:40 ratio of butadiene-styrene copolymer backbone to methyl methacrylate-styrene monomer mixture. The present invention is not limited to any such specific ratio. Graft copolymer blending components prepared using butadiene-styrene copolymer backbone:methyl methacrylate-styrene monomer mixtures over a wide range of ratios are effective.

matics as alpha methyl styrene, vinyl toluenes, alpha methyl vinyl toluenes, and the like, including mixtures of two or more such vinyl aromatics (including styrene).

While the polycarbonate of 2,2-(4,4'-dihydroxy-diphenyl)-propane has been used in the specific examples, other polycarbonates of di-(monohydroxyphenyl)-substituted aliphatic hydrocarbons, in which both hydroxyphenyl groups are attached to the same carbon atom of the hydrocarbon, can be substituted therefor. Suitable polycarbonates of di-(monohydroxyphenyl)-substituted aliphatic hydrocarbons are, for example, the polycarbonates of (4,4'-dihydroxy-diphenyl)-methane; 1,1-(4,4'-dihydroxy-diphenyl)-cyclohexane; 2,2 - (4,4' - dihydroxy-diphenyl)-butane; 2,2-(4,4'-dihydroxy-diphenyl)-pentane; 2,2-(4,4'-dihydroxy-diphenyl)-hexane; and 2,2-(4,4'-dihydroxy-diphenyl)-heptane.

The blends of the present invention find their field of greatest usefulness in the fabrication of shaped articles that are most economically produced by injection molding techniques, particularly rigid shaped articles that are subjected to stresses during assembly and that may be subsequently subjected to vibration, shock, impact loads, and the like during use. Also, the blends of this invention may be processed by calendering, vacuum forming, extrusion, and similar known production techniques.

While this invention has been described in connection with certain specific details and examples thereof, these details and examples are illustrative only and are not to be considered limitations on the spirit or scope of said

I claim:

1. A composition comprising a blend of (a) the polycarbonate of a di-(monohydroxyphenyl)-substituted aliphatic hydrocarbon with phosgene and (b) a graft copolymer of (1) a butadiene-vinyl aromatic hydrocarbon copolymer and (2) a mixture of an alkyl acrylate and a vinyl aromatic hydrocarbon.

2. A composition comprising a blend of (a) the polycarbonate of 2,2-(4,4'-dihydroxy-diphenyl)-propane with phosgene and (b) a graft copolymer of (1) a butadiene-vinyl aromatic hydrocarbon copolymer and (2) a mixture of an alkyl acrylate and a vinyl aromatic hydrocarbon.

3. A composition comprising a blend of (a) the polycarbonate of 2,2-(4,4'-dihydroxy-diphenyl)-propane with phosgene and (b) a graft copolymer of (1) a butadiene-vinyl aromatic and (2) a mixture of methyl methacrylate and styrene.

4. A composition comprising a blend of (a) the polycarbonate of 2,2-(4,4'-dihydroxy-diphenyl)-propane with phosgene and (b) a graft copolymer of (1) a butadiene-styrene copolymer and (2) a mixture of an alkyl acrylate and a vinyl aromatic hydrocarbon.

References Cited in the file of this patent

UNITED STATES PATENTS 2,789,971    Reynolds et al. ---------- Apr. 23, 1957

FOREIGN PATENTS 772,627    Great Britain ------------ Apr. 17, 1957
778,102    Great Britain ------------ July 3, 1957

UNITED STATES PATENT OFFICE
CERTIFICATE OF CORRECTION

Patent No. 3,162,695                December 22, 1964

Thomas S. Grabowski

It is hereby certified that error appears in the above numbered patent requiring correction and that the said Letters Patent should read as corrected below.

Column 4, line 5, strike out "that is", and insert the same after "mixture" in line 14, same column 4.

Signed and sealed this 4th day of May 1965.

(SEAL)
Attest:

ERNEST W. SWIDER                EDWARD J. BRENNER
Attesting Officer                Commissioner of Patents